United States Patent Office 3,006,810
Patented Oct. 31, 1961

3,006,810
METHOD AND PRODUCT FOR IMPROVING THE ECONOMIC VALUE OF DOMESTIC ANIMALS
Byron M. Shinn, Western Springs, and Emil Kaiser, Chicago, Ill., assignors, by mesne assignments, to Armour & Company, Chicago, Ill., a corporation of Delaware
No Drawing. Filed July 11, 1958, Ser. No. 747,820
8 Claims. (Cl. 167—53)

The present invention relates to a method and product for improving the economic value of domestic animals which are raised principally for the edibility of their flesh.

It has been found that a number of so called "growth promoting materials" when fed to or given parenterally to domestic animals will improve the return that a producer can usually expect from his investment in the raising of such animals. Within this general category fall the antibiotics. It is believed that the principal effect of the antibiotics is to supress diseases of the animals including those subclinical diseases which are not apparent in the animals. Since the animals therefore, are more healthy they will tend to grow and/or gain weight at an increased rate.

Another class of materials that fall within the "growth promotant" category is that of the estrogenic compounds. An example of such an estrogenic compound that has come into rather widespread use is diethylstilbestrol. The growth and/or weight promotion advantages of these estrogenic compounds has made their use desirable and profitable even though it has been recognized, as hereinafter discussed, that their use presents certain inherent difficulties and hazards. We have discovered that, surprisingly enough, some of the derivatives of some of these estrogenic materials, which derivatives exhibit only a negligible fraction of the estrogenic effects of the parent materials, still have a growth and/or weight promoting effect comparable to that of the parent materials.

The estrogenic compounds generally have been introduced into the animal either by implanting or by addition to the nutritional material fed to the animal. When the estrogenic material is implanted, some of the material may remain in the carcass at the time the animal is slaughtered for food. As a result, care must be taken to see that the portion of the carcass within which the implant was made is detached from the portion of the carcass which is to be eaten. If any of the estrogenic material would remain and be eaten by an individual, that individual would be affected by the estrogenic effects of the material. This problem becomes substantially less acute with the present invention because of the negligible estrogenicity of the derivatives which are the subject matter of the present invention.

While the addition of the estrogens to the animal feed decreases the likelihood that there will be any residual estrogenic material deposited in the carcass of the animal after slaughtering, there is some evidence that the carcass may not be entirely free from the estrogenic material that the animal had been fed. Tests have indicated that residual estrogenic material, if any, is present in very minute quantities if such animals are fed according to established practice. But, there are those who believe that even these minute quantities would exert harmful effects on people who consumed meat, over an extended period of time, from animals fed estrogenic materials. There also is a real hazard to persons concerned in the process of handling estrogenic materials in the preparation of feed premixes and in the process of introducing the material into the feeds, etc. To the extent that these problems do exist they will be substantially eliminated by the use of the material contemplated by the present invention because of its being substantially free from estrogenic activity.

Another problem encountered with respect to the use of estrogenic compounds as growth promoting materials has been the fact that in many instances their use will result in a down grading of the carcass of the animal. The carcass may be down graded to an extent such that even though more pounds of edible flesh are produced for each dollar invested in the raising of the animal, the total economic return from the sale of the animal for food actually will be less than that received from animals which have not been fed the estrogenic compounds. The estrogens have been demonstrated to cause prolapse of the vagina in heifers. It has been reported that a condition resembling urinary calculi may result in wether lambs supplied with the estrogenic materials. Generally these factors have dictated that the estrogenic compounds be introduced into the animals at sufficiently low levels to reduce, if not eliminate, the problems. However, at the lower levels the desirable "growth promoting" effect of the estrogenic compound also may be reduced. These problems are substantially eliminated through the practice of the present invention.

Insofar as ruminants are concerned the advantages in the use of the estrogenic "growth promotants" are obtained when the estrogenic compounds are supplied to other than non-castrated male animals. Similarly, the primary advantages of the present invention, insofar as ruminants are concerned, are obtained when our material is supplied, orally or parenterally, to other than non-castrated males, i.e. wethers and ewes, steers and heifers, etc.

The principal object of the present invention is to obtain the desirable growth and/or weight promoting effects of the estrogenic compounds while substantially eliminating the undesirable effects associated therewith. When supplied with the material of this invention female and castrated male ruminants exhibit an increase in growth without the substantial downgrading often associated with estrogens. Poultry supplied with this material in accordance with our invention show an improvement in the "finish" of the birds as shown by another application filed concurrently herewith. This is achieved by introducing into the animals estrogen derivatives, namely, substances comprising 4,4'-oxygenated stilbene derivatives or 4,4'-oxygenated diphenylhexane derivatives, said derivatives having at least two substituents in the aromatic nuclei, the substituents being made up of aliphatic straight chains containing at least two carbon atoms, branched chains, aromatic rings, and cyclic heterocyclic rings. These materials have the following general chemical structure:

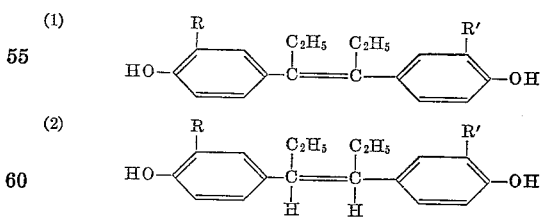

Broadly, R and R' are alkyl, aryl or cyclic compounds. More specifically, R and R' could be an allyl, propenyl, propyl, cyclopentenyl, cloroallyl, bromoallyl, methallyl, hexyl, octyl, benzyl, phenyl, toluyl or cyclopentyl group. Specific examples of materials in this general class are 3,3'-diallyldiethylstilbestrol; 3,3'-diallylhexestrol; 3,3'-dipropylhexestrol; 3,3'-dipropyldiethylstilbestrol; 3,3'-dipropenylhexestrol; 3,3'-diallyl, 4,4'-dihydroxydiphenylhexane; 3,3'-dipropyl, 4,4'-dihydroxydiphenylhexane; and 3,3'-dipropenyl, 4,4'-dihydroxydiphenylhexane. The production of such materials is disclosed in United States Patent No. 2,502,324 and Patent No. 2,502,325. The materials should be introduced into the immature animals during at least a portion of the growth period thereof.

The insignificant estrogenic effect of 3,3'-diallylhexestrol and 3,3'-diallyldiethylstilbestrol as compared to diethylstilbestrol was demonstrated by following the test outline in detail in "Detection of Estrogenic Substances in Alfalfa and Clover Hays Fed to Fattening Lambs," by Cheng et al., Journal of Animal Science, January 1953. In these tests the effect of the materials in stimulating the increase in uterine weight of immature female mice was measured and it was found that the 3,3'-diallyldiethylstilbestrol and the 3,3'-diallylhexestrol had from 0.04% to 0.08% of the estrogenic activity of diethylstilbestrol. The substantial lack of estrogenic effect of the stilbene derivatives is also demonstrated by the information set forth in the publication "Preparation of New Derivatives of Diethylstilbestrol and Hexestrol by the Claisen Rearrangement," Kaiser et al., Journal of the Americal Chemical Society, vol. 68, p. 636 et seq.

Example I

This example demonstrates the improvement in weight gain of ruminant animals when their feed was supplemented by 3,3'-diallyldiethylstilbestrol and by 3,3'-diallylhexestrol. It is important to note that the groups that received the supplements graded as well as or better than the control group. The grading system employed was an arbitrary grading from 1 to 10 with 1 being the culls and 10 being the high choice.

In this example 15 lambs having an average weight of 68.5 pounds were divided into three groups with each group consisting of wethers and ewes divided as equally as possible. The first group was the control group and was fed a basal ration consisting of 55% alfalfa and 45% cracked corn with loose minerals, free choice. The second group was fed the same basal ration plus 5 mg. per lamb per day of a supplement consisting of 3,3'-diallyldiethylstilbestrol. The third group received the same basal ration plus 5 mg. per lamb per day of a supplement consisting of 3,3'-diallylhexestrol. The results were as follows:

| Group | Improvement in Gain | | Grade | Improvement in Feed Efficiency—13 Weeks |
|---|---|---|---|---|
| | 9 Weeks | 13 Weeks | | |
| | Percent | Percent | | Percent |
| 1 | | | 8.4 | |
| 2 | 34 | 33 | 8.5 | 35 |
| 3 | 32 | 22 | 8.4 | 22 |

Feed efficiency as used herein may be defined as the units of weight of feed consumed to produce a weight gain of the animal of one unit of weight.

Example II

This example compared 3,3'-diallyldiethylstilbestrol with other growth promoting materials, i.e. diethylstilbestrol and trimethylalkylammonium stearate (the subject matter of another invention). Both the 3,3'-diallyldiethylstilbestrol and the diethylstilbestrol were supplied to the animals as implants. The trimethylalkylammonium stearate was supplied to the animals by mixing in their feed a composition comprising 20% trimethylalkylammonium stearate and 80% steamed bone meal as a carrier, which composition is sold under the trademark Dynafac. Lambs were chosen as the subject animal because of the sensitivity of lambs to estrogenic materials that has been observed previously. The lambs, having an average initial weight of 63.75 pounds, were divided into six groups with 14 wethers and 6 ewes per group. Each group was fed a ration of 40% cracked corn, 45% alfalfa, 10% molasses, 4% ground corn cobs and 1% mineral supplement for a period of 89 days. After slaughter the lambs were graded. The six groups were treated as follows.

Group:
1 —— Control.
2 —— 250 mg. Dynafac per pound of feed.
3 —— 8 mg. of 3,3'-diallyldiethylstilbestrol implanted in each animal.
4 —— 10 mg. of diethylstilbestrol implanted in each animal.
5 —— Same implant of group 3 plus feed additive of group 2.
6 —— Same implant of group 4 plus feed additive of group 2.

The results of the test were as follows:

| Group | Improvement in | | Grade | | |
|---|---|---|---|---|---|
| | Gain | Feed effic. | Good | Utility | Cull |
| | Percent | Percent | | | |
| 1 | | | 12 | 7 | 1 0 |
| 2 | 22 | 20 | 10 | 10 | 0 |
| 3 | 30 | 24 | 12 | 8 | 0 |
| 4 | 44 | 33 | 7 | 12 | 1 |
| 5 | 30 | 23 | 12 | 7 | 1 0 |
| 6 | 37 | 33 | 5 | 11 | 4 |

[1] One died from a combination of worms and coccidiosis.

The foregoing detailed description is only for clearness of understanding and for the purpose of complying with 35 U.S.C. 112 and we do not desire to be limited to the exact details for obvious modifications will occur to a person skilled in the art.

We claim:

1. The method of increasing the growth of ruminants of the class consisting of females and male castrates including the step of introducing into said ruminants during at least a portion of the growth period of the immature ruminants an effective amount of a substance selected from the group consisting of 4,4'-oxygenated 3,3'-substituted diethylstilbestrol derivatives and 4,4'-oxygenated 3,3'-substituted hexestrol derivatives, the substituents at said 3,3' positions being selected from the class consisting of aliphatic straight chains containing at least two carbon atoms, aliphatic branched chains, and aromatic rings.

2. The method of increasing the growth of ruminants of the class consisting of females and male castrates including the step of implanting in the immature ruminants an effective amount of a substance selected from the group consisting of 4,4'-oxygenated 3,3'-substituted diethylstilbestrol derivatives and 4,4'-oxygenated 3,3'-substituted hexestrol derivatives, the substituents in said 3,3' positions being selected from the class consisting of aliphatic straight chains containing at least two carbon atoms, aliphatic branched chains, and aromatic rings.

3. The method of increasing the growth of ruminants of the class consisting of females and male castrates including the step of supplementing the feed of the immature ruminants with an effective amount of a substance selected from the group conisting of 4,4'-oxygenated 3,3'-substituted diethylstilbestrol derivatives and 4,4'-oxygenated 3,3'-substituted hexestrol derivatives, the substituents in said 3,3' positions being selected from the class consisting of aliphatic straight chains containing at least two carbon atoms, aliphatic branched chains, and aromatic rings.

4. An animal feed comprising a nutrient material and an effective amount of a substance selected from the group consisting of 4,4'-oxygenated 3,3'-substituted diethylstilbestrol derivatives and 4,4'-oxygenated 3,3'-substituted hexestrol derivatives, the substituents in said 3,3' positions being selected from the class consisting of aliphatic straight chains containing at least two carbon atoms, aliphatic branched chains and aromatic rings.

5. The method of increasing the growth of ruminants of the class consisting of females and male castrates including the step of introducing into said ruminants during at least a portion of the growth period of the immature ruminants an effective amount of a substance comprising 3,3'-diallyldiethylstilbestrol.

6. The method of increasing the growth of ruminants of the class consisting of females and male castrates including the step of introducing into said ruminants during at least a portion of the growth period of the immature ruminants an effective amount of a substance comprising 3,3'-diallylhexestrol.

7. An animal feed comprising a nutrient material and an effective amount of 3,3'-diallyldiethylstilbestrol.

8. An animal feed comprising a nutrient material and an effective amount of 3,3'-diallyhexestrol.

References Cited in the file of this patent

UNITED STATES PATENTS 2,751,303    Burroughs _____ June 19, 1956

OTHER REFERENCES

Kaiser et al.: Jr. Am. Chem. Soc. 68 (1946) pp. 636–8.